Jan. 22, 1924.  
R. L. MILLER  
1,481,616  
VALVE MECHANISM FOR AUTOMATIC TRAIN CONTROL APPARATUS  
Filed March 6, 1922   3 Sheets-Sheet 1

Inventor  
Robert L. Miller,  
by Bright & Bailey  
Attorneys

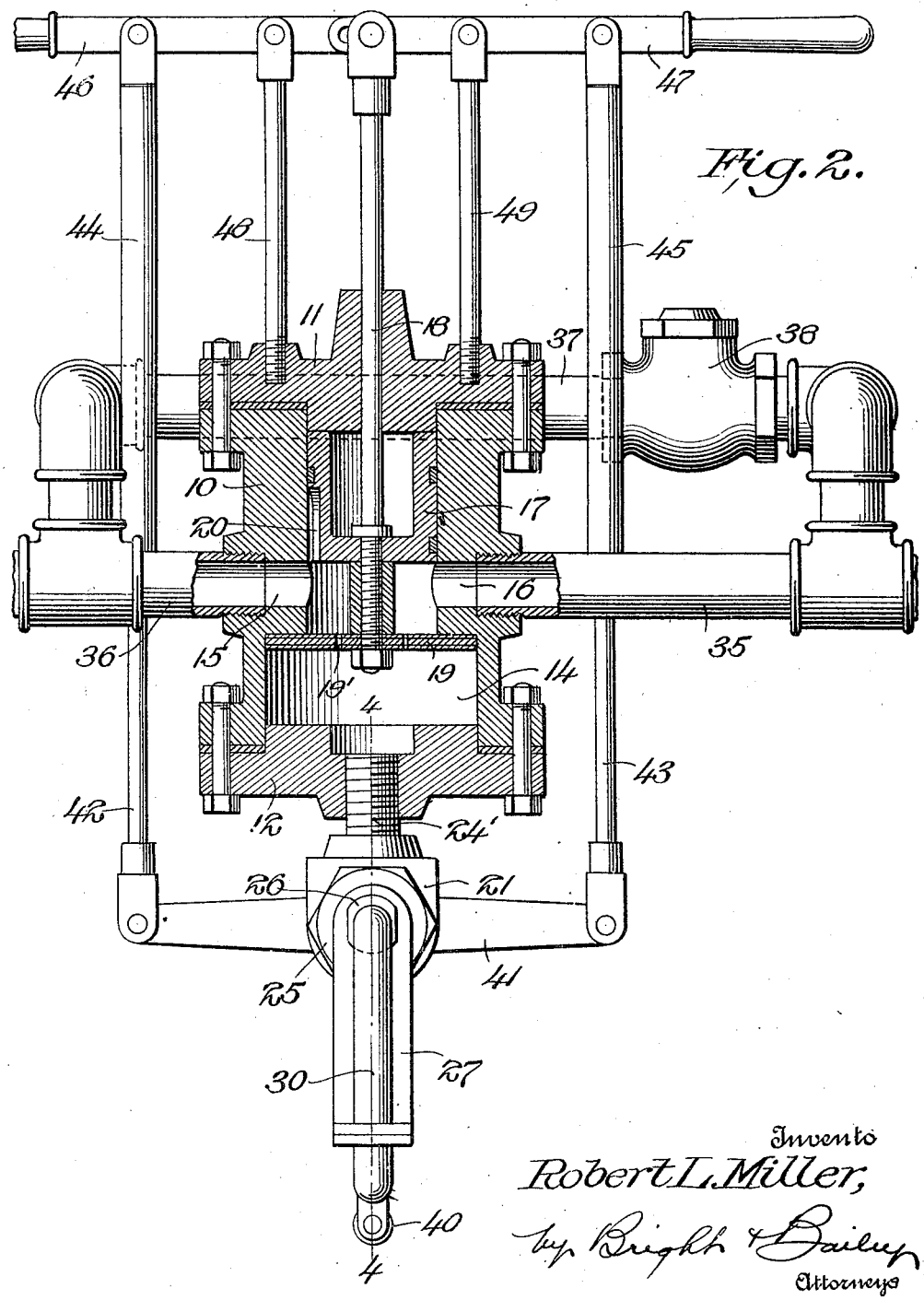

Jan. 22, 1924.  1,481,616
R. L. MILLER
VALVE MECHANISM FOR AUTOMATIC TRAIN CONTROL APPARATUS
Filed March 6, 1922   3 Sheets-Sheet 3

Inventor
Robert L. Miller,
by Bright & Bailey
Attorneys

Patented Jan. 22, 1924.

1,481,616

UNITED STATES PATENT OFFICE.

ROBERT L. MILLER, OF SPOKANE, WASHINGTON, ASSIGNOR TO OTIS AUTOMATIC TRAIN CONTROL, INC., OF SPOKANE, WASHINGTON, A CORPORATION OF WASHINGTON.

VALVE MECHANISM FOR AUTOMATIC TRAIN-CONTROL APPARATUS.

Application filed March 6, 1922. Serial No. 541,552.

*To all whom it may concern:*

Be it known that I, ROBERT L. MILLER, a citizen of the United States, and resident of Spokane, in the county of Spokane and State of Washington, have invented certain new and useful Improvements in Valve Mechanism for Automatic Train-Control Apparatus, of which the following is a specification.

My invention relates to valve mechanisms for automatic train control apparatus and has particular reference to improvements in valve mechanisms of the general type disclosed in the copending application of Kent and Miller filed July 27, 1921 and serially numbered 487,946.

The purpose of my invention, broadly, is to provide a valve mechanism which will permit an engineer to set or release his brakes during such times as he is alert and properly observant of signals, but which will act, upon contact with track devices which are preferably operated in conjunction with the usual signals, to cause an automatic application of his brakes in the event he fails to observe or heed said signals.

More specifically it is the purpose of my present invention to provide a valve mechanism including a track device engaging and valve operating element which is pivoted instead of being vertically slidable as disclosed in the application above identified, whereby the structure of the mechanism as an entirety may be simplified, rendered quicker and more positive in operation and readily restored to normal position by a novel resetting mechanism following actuation thereof by a track device.

My inventive idea is capable of embodiment in different mechanical constructions and arrangements, one of which is illustrated in the accompanying drawings, but it is to be understood that the structure shown is merely intended as a disclosure of the essential features and novel characteristics of my invention in a preferred form, and that various changes, modifications and desirable additions may be made in and to the same within its scope as defined in the appended claims.

Figure 1:
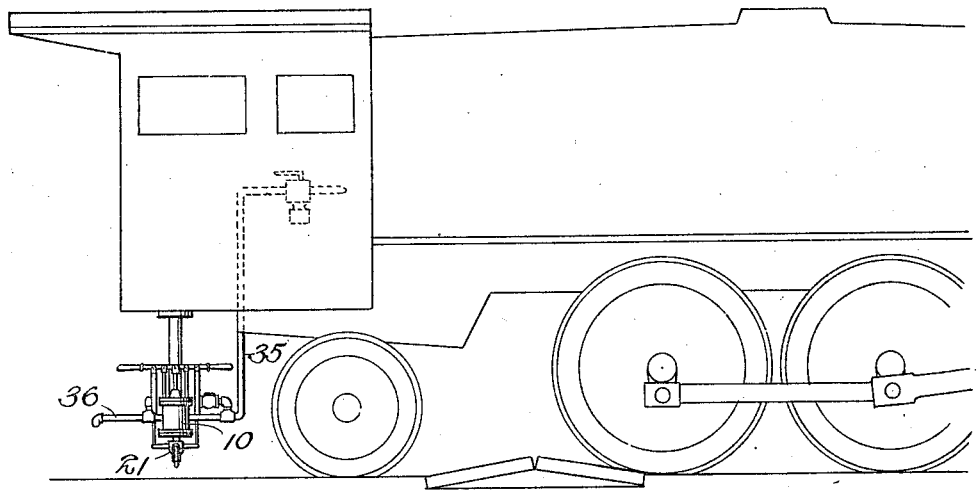
Figure 4:
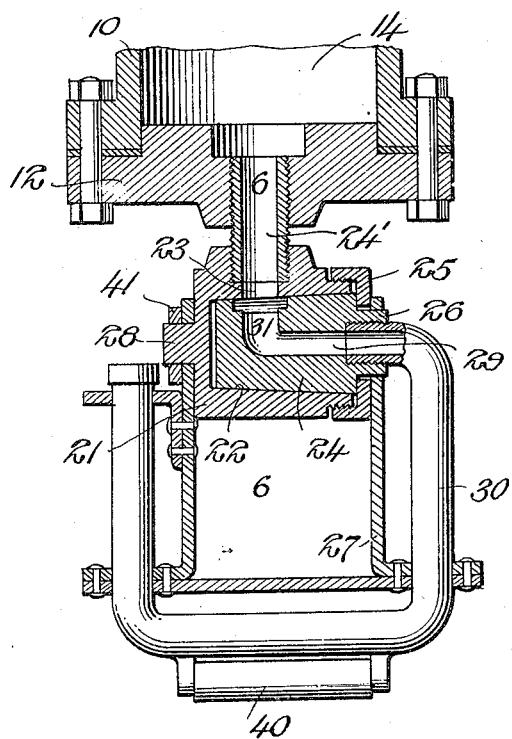
Figure 3:
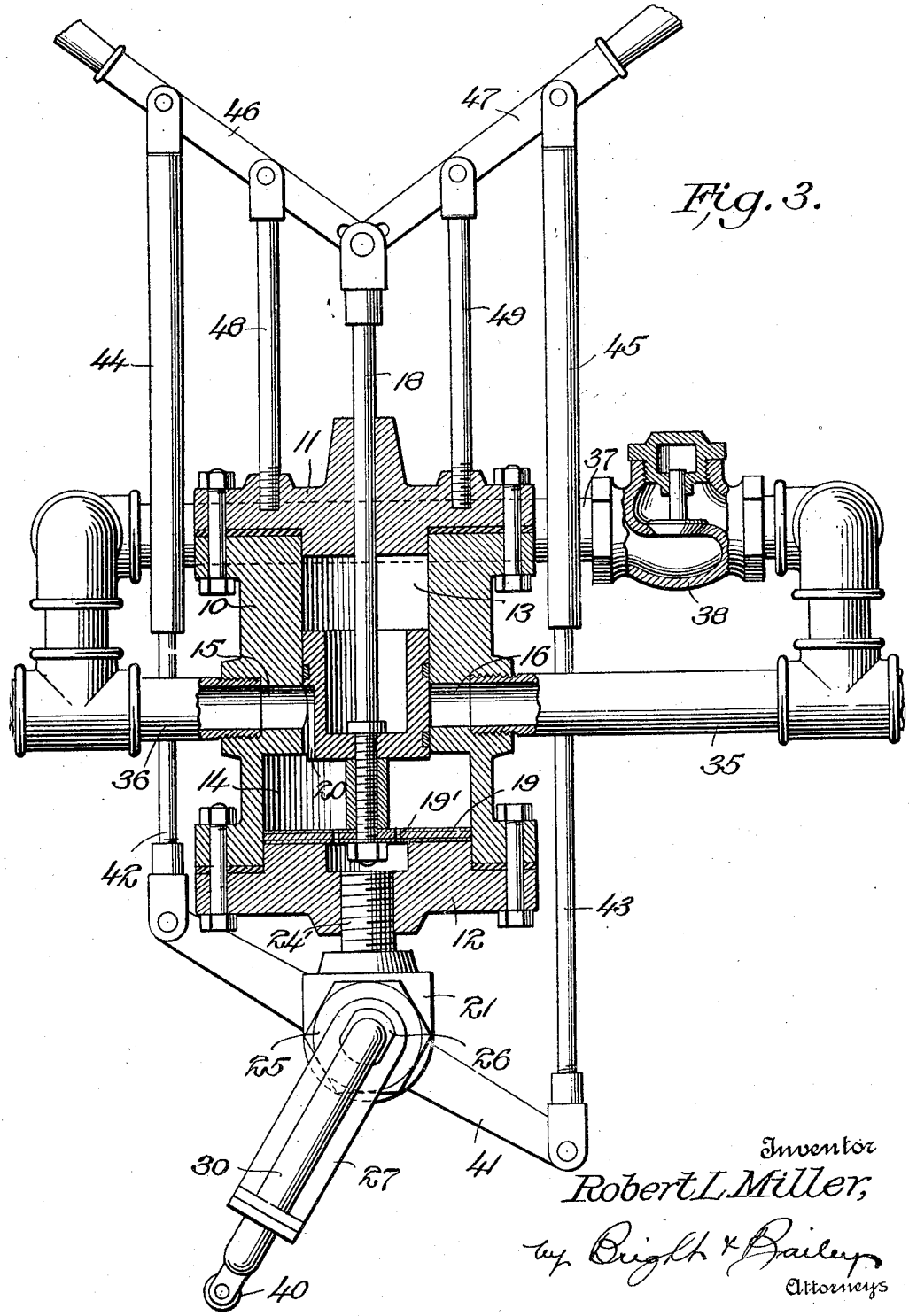

In the drawings which are illustrative of features of novelty to be more fully described in detail hereinafter, and wherein like characters of reference denote corresponding parts in the different views, Figure 1 is a conventional side elevation of a locomotive equipped with my improved valve mechanism;

Figure 2, a vertical section of my improved valve mechanism showing the normal position of the parts thereof;

Figure 3, a view similar to Fig. 2 showing the parts of the mechanism in one position they occupy to cause an application of the brakes;

Figure 4, a section on the line 4—4 of Fig. 2.

Figure 5:
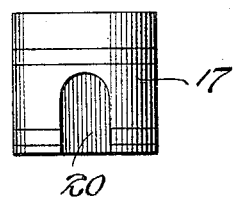

Figure 5, a side elevation of the piston; and

Figure 6:
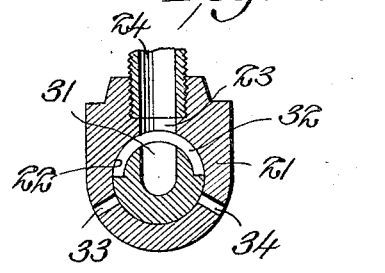

Figure 6, a section on the line 6—6 of Figure 4.

Referring now to the drawings in detail, 10 designates a valve casing which is preferably though not necessarily closed at its ends by upper and lower heads 11 and 12, and which is adapted to be suitably and permanently secured to a locomotive or other like vehicle at some convenient point, preferably beneath the cab floor thereof, so as to be disposed for actuation by suitable ramp devices located along the tracks.

The upper portion of the bore of the casing 10 is of less diameter than the lower portion 14 thereof and extending through the sides of the casing and opening into the bore 13 near the lower end thereof are port openings 15 and 16, which preferably are horizontally alined.

Slidably arranged in the bore 13 is a piston 17 connected by means of a rod 18 with a second piston 19 which latter is in the form of a disk provided with one or more perforations 19' and slidably arranged in the larger bore 14. Disk 19 is maintained spaced with respect to the piston 17 in any suitable manner and as shown rod 18 extends upward through the head 11 whereby both pistons may be manually operated.

The permissible amount of sliding movement of the pistons 17 and 19 is limited by the length of the bores 13 and 14 and when said pistons are disposed at their limit of movement in one direction, uppermost in the arrangement shown, communication is established between ports 15 and 16 through the space between the pistons, as shown in Figure 2, but when the pistons are disposed at their other limit of movement, lowermost in the present instance, such communication is cut off by piston 17. Port 15, however, is at all times in communication with the bores of the casing by reason of a port in the form of a recess 20 cut in the outer face of piston 17 and opening through the lower end of the latter and which is adapted to register with port 15 when said piston is moved downward. Gaskets on the piston 17 serve to prevent the escape of fluid past said piston in all positions of the latter into the upper portion of bore 13.

Located exteriorly of the casing 10, preferably below the latter, is a valve casing 21 which is provided with a bore 22 whose axis is preferably horizontally disposed and in constant communication with the bore 14 of casing 10 below piston 19. This casing 21 in the present instance is provided with a passage 23 opening into the bore 22 and having threaded therein a pipe 24' which is also threaded into the lower head 12 of casing 10, whereby the aforementioned communication between the bores 14 and 22 is established, or the same condition may be accomplished in any other suitable manner as is obvious.

Rotatably disposed in the bore 22 of valve casing 21 is a plug valve 24 which is retained within the casing 21 by a nut 25 and which is provided with a non-circular extension 26 upon which is mounted one arm of a U-shaped yoke 27, whereby swinging or angular movements of the latter are transmitted to the plug, the other arm of the yoke being pivoted to and supported by an extension 28 on the casing, so that the yoke as an entirety is mounted for pivotal movement on an axis coincident with the axis of the plug.

Formed in and opening through one end of the plug 24 is a longitudinal passage 29 which has threaded therein one end of a pipe 30 which is bent into substantial U-shape and passes through openings in the yoke 27 whereby it is movable in unison with said yoke. Passage 29 extends only partly through the plug and at its inner end is in communication with a radial passage 31 which opens through the side of the plug into a circumferential channel 32 which extends substantially one-half the way around the plug. This channel is adapted to communicate at predetermined times, upon rotation of the plug in different directions, with one or the other of a pair of relatively small ports or passages 33, 34 formed in the casing 21 and opening to the atmosphere.

The structure described in the foregoing constitutes all of the essential elements of my improved valve mechanism and when the same is disposed in operative relation with an air brake system of well known type, the air supply pipe 35 is connected with port 16 and the train line pipe 36 is connected with port 15, while said pipes 35 and 36 are connected by a by-pass pipe 37 having a check valve 38 disposed therein which opens in the direction of the supply pipe. Normally the pistons 17 and 19 are disposed at their uppermost limit of movement establishing communication between the pipes 35 and 36 through the space between said pistons whereby air may be supplied to and exhausted from the train line in the ordinary manner for controlling the brakes; the ramp engaging shoe constituted by the yoke 27 and pipe 30 is disposed vertically thus causing the plug valve 24 to seal both ports 33, 34, and train line pressure, because of openings 19', extends to the larger bore 14 of casing 10 below piston 19, and through pipe 24' and passage 31, 29 into the pipe 30.

Now when the locomotive carrying the mechanism is under way and the shoe comes in contact with a ramp device such as indicated at 39 in Fig. 1 of the drawings set to operate the mechanism, said shoe is moved angularly in one direction or the other, depending upon whether the locomotive is backing up or moving ahead, to be left as shown in Fig. 3 of the drawings, whereupon the plug valve 24 is rotated and channel 32 moved into registration with one or the other of ports 33, 34, port 34 in the instance given, thus placing bore 14 of casing 10 in communication with the atmosphere and resulting in an immediate reduction of pressure below piston 19, which latter is then moved downward by the train line pressure above it until piston 17 closes port 16 and cuts off communication between the train line and supply pipes 35 and 36. As long as the channel 32 remains in registration with port 34 train line pressure exhausts gradually through the small openings 19' in the piston 19 to the atmosphere thus causing a reduction in the train line pressure and as a consequence a service application of the brakes. If, however, it is desired to obtain an emergency application the engineer may do so by exhausting air by means of his ordinary control valve by way of by-pass pipe 37. He cannot, however, admit air to the train line to release the brakes because of check valve 38.

Preferably the pipe 30 is provided with a roller 40 for contact with the ramp devices mentioned and due to the fact that train line pressure normally exists in said pipe 30 it is apparent that a rupture of said pipe will result in exhaust of air below the piston 19 and a consequent reduction of train line pressure the same as in the ordinary operation of the mechanism, regardless of whether the plug 24 is or is not rotated.

It is desirable to provide means whereby the mechanism may be conveniently restored to normal position following its operation by a ramp device and after the train has been brought to a stop so that it may again proceed when the road is clear. To this end I secure to the yoke 27 so as to be movable in unison therewith an arm 41 which extends beyond opposite sides of the valve casing 21 and has connected to its free ends a pair of rods 42 and 43, respectively, which extend upward past the valve casing 10 and are slidably received in tubes 44, 45 connected respectively, to a pair of levers 46, 47 which have their inner ends pivoted to the upper end of rod 18. Said levers are fulcrumed respectively to supports 48, 49 rising from the upper head 11 of valve casing 10 so that when the shoe is moved angularly and the pistons 17 and 19 move downward they are elevated as shown in Figure 3, following which, depression of one or the other of them will move both to a horizontal position and restore the normal status of the mechanism as is obvious.

From the foregoing description taken in connection with the accompanying drawings, it is believed that the construction, operation and advantages of my improved valve mechanism will be clearly understood, and while I have herein shown and described one specific embodiment of my invention I desire to have it understood that I include as falling within the scope of the same all such modifications and changes as may fall within the scope of the appended claims.

I claim:—

1. In automatic train control apparatus, a valve mechanism operable at predetermined times to effect a reduction in train line pressure, a rotatable ramp engageable shoe having a normal perpendicular position and operable when rotated in either direction from its normal position to initiate operation of said valve mechanism, a pair of arms extending from said shoe, a pair of levers mounted on said valve mechanism and telescoping connections between related arms and levers whereby one of the latter is operable to restore said shoe to normal position following its rotation in one direction and the other is operable to restore the same to normal position following its rotation in the other direction.

2. In automatic train control apparatus, a valve mechanism operable at predetermined times to effect a reduction in train line pressure, a rotatable ramp engageable shoe having a normal perpendicular position and operable when rotated in either direction from its normal position to initiate operation of said valve mechanism, a pair of arms extending from said shoe, a pair of levers mounted on said valve mechanism and telescoping connections between related arms and levers whereby one of the latter is operable to restore said shoe to normal position following its rotation in one direction and the other is operable to restore the same to normal position following its rotation in the other direction, both of said levers being connected with said valve mechanism whereby the latter is restored to normal position simultaneously with said shoe when either lever is actuated.

In testimony whereof I hereunto affix my signature.

ROBERT L. MILLER.